United States Patent [19]

Kimura et al.

[11] Patent Number: 5,379,553
[45] Date of Patent: Jan. 10, 1995

[54] DOOR STRUCTURE FOR VEHICLE AND METHOD FOR ASSEMBLING SUCH DOOR STRUCTURE

[75] Inventors: Koichi Kimura; Kiyoto Matsuzaki, both of Yokohama, Japan

[73] Assignee: Nissan Motor Co., Ltd., Yokohama, Japan

[21] Appl. No.: 165,810

[22] Filed: Dec. 13, 1993

[30] Foreign Application Priority Data

Dec. 18, 1992 [JP] Japan .................. 4-338903

[51] Int. Cl.⁶ .............................. B60J 5/04
[52] U.S. Cl. .............................. 49/502; 49/506
[58] Field of Search ............... 49/502, 503, 506, 352; 296/146.2

[56] References Cited

U.S. PATENT DOCUMENTS

| 4,785,585 | 11/1988 | Grier et al. | 49/502 |
| 5,050,350 | 9/1991 | Bertolini et al. | 49/506 X |
| 5,090,158 | 2/1992 | Bertolini | 49/502 X |

FOREIGN PATENT DOCUMENTS 59-34923 2/1984 Japan .
63-60375 3/1988 Japan .

*Primary Examiner*—Philip C. Kannan
*Attorney, Agent, or Firm*—Foley & Lardner

[57] ABSTRACT

A door structure for a vehicle includes an outer module including an inner panel and an outer panel connected to the inner panel. The inner panel has an opening defined in part by first and second edges having a distance L1 therebetween. The door structure also includes a regulator module having an inner frame which is fixed to the inner panel, a regulator fixed to the inner frame, and a window panel fixed to the regulator and being movable by the regulator between first and second positions. The window panel has a maximum width L2, an edge sloped relative to a horizontal plane and a corner opposite from the sloped edge such that a distance L3 between the corner and the sloped edge, as measured along an imaginary line intersecting the sloped edge at a right angle, is less than L1, and L2 is greater than L1. A method for assembling the door structure includes rotating the regulator module so that it may pass between the first and second edges.

6 Claims, 6 Drawing Sheets

DOOR STRUCTURE FOR VEHICLE AND METHOD FOR ASSEMBLING SUCH DOOR STRUCTURE

BACKGROUND OF THE INVENTION

1. FIELD OF THE INVENTION

The present invention relates a door structure for a vehicle and a method for assembling such a door structure.

2. BACKGROUND OF THE RELATED ART

In general, conventional vehicle doors have a basic structure including an outer module and a regulator module which is assembled to the outer module. The outer module includes an outer panel, an inner panel and a sash. The inner panel is fixed at the inside of the outer panel and has a large opening defined therein. The regulator module includes an inner frame, a regulator fixed onto the outside of the inner frame, and a door window panel fixed to the outside of the regulator.

FIG. 1 shows a cross-section of a conventional door structure 1 of a vehicle. The outer module 2 includes an outer panel 3 and an inner panel of which top and bottom flanges 5, 7 are shown. A cut-out 9 is defined within the inner panel between the flanges 5, 7 and upstanding vertical walls (not shown) of the inner panel. The regulator module 11 includes a window panel 13 having a leading edge 13a. The window panel 13 is connected to and movable relative to an inner frame 15 via a regulator device 17. During assembly of the door structure 1, it is necessary to position the window panel 13 through the cut-out 9 and into a space 19 defined between flange 5 and an upper edge 21 of outer panel 3. However, since the distance between the top and bottom flanges 5, 7 is less than the vertical length of the window panel 13, it is not possible to directly place window panel 13 into space 19. Rather, in order to get window panel 13 fixed in its operating position (shown in dotted lines), the leading edge 13a is first passed through the cut-out 9 and into space 19 while the window panel 13 is held at an angle as shown in solid lines in FIG. 1. Once the leading edge 13a is positioned in space 19, the window panel 13 can be simultaneously rotated in the direction of the arrow and pushed upward until it is in the operating position shown in dotted lines. At this point, the inner frame 15 can be mounted to flanges 5, 7 to secure the regulator module 11 in place. The window panel 13 is then movable up and down within space 19 due to the action of the regulator device 17 which can be a manual or power operated device.

Examples of conventional vehicle door structures as discussed above and the conventional processes for assembling such door structures are disclosed in Japanese Patent Provisional Publication No. 63-60375 and Japanese Patent Provisional Publication No. 59-34923. However, these conventional vehicle door structures and their associated assembly processes have numerous disadvantages.

First, during assembly, the door window panel 13 must pass through the cut-out 9 of the inner panel and the space 19 without touching the flange 5 or the upper edge 21 of the outer panel 3. If contact were to occur, the window panel could be damaged or broken. Thus, in order to provide sufficient maneuvering room during the positioning of the window panel 13 within space 19, the width of space 19 (between flange 5 and upper edge 21) is made sufficiently large. Thus, the overall dimensions of the door structure are increased and the appearance of the door structure diminished.

Secondly, since the window panel 13 must be pushed upward and rotated during assembly, if the window panel 13 is formed with a large radius of curvature R, it becomes more difficult to fix the regulator module 11 to the flanges 5, 7. That is, the physical movement required to handle the regulator module 11 so that the window panel 13 is properly positioned becomes even more complicated.

Thirdly, at a first point where the regulator device 17 is attached to the inner frame 15 and a second point where the regulator device 17 is connected to the window panel 13, large loads are applied during assembly due to the upward and rotating movement. The large loads require that the regulator device 17 be capable of withstanding such loads and therefore minimizes flexibility in the design of the regulator device 17.

SUMMARY OF THE INVENTION

It is an object of the present invention to provide a vehicle door structure which is easy to assemble.

It is yet another object of the present invention to provide a simple method for assembling a door structure.

A further object of the present invention is to provide a vehicle door structure and a method of assembling such a door structure which does not place undue restrictions on the regulator used in the vehicle door structure.

According to the present invention, the above objects are met by providing a door structure for a vehicle including an outer module having an inner panel and an outer panel connected to the inner panel, the inner panel having an opening defined in part by first and second edges having a distance L1 therebetween; a regulator module including an inner frame which is fixed to the inner panel, a regulator fixed to the inner frame, and a window panel connected to the regulator and being movable by the regulator between first and second positions, wherein the window panel has a maximum width L2, an edge sloped relative to a horizontal plane and a corner opposite to the sloped edge such that a distance L3 between the corner and the sloped edge, as measures along an imaginary line intersecting the sloped edge at a right angle, is less than L1, and L2 is greater than L1.

The above objects are also met by providing a process for assembling a door structure of a vehicle comprising of the steps of: (A) providing an outer module including an inner panel and an outer panel connected to the inner panel, the inner panel having an opening defined in part by first and second edges having a distance L1 therebetween; (B) providing a regulator module including an inner frame which is fixed to the inner panel, a regulator fixed to the inner frame, and a window panel connected to the regulator and being movable by the regulator between first and second positions, wherein the window panel has a maximum width L2, an edge sloped relative to a horizontal plane and a corner opposite to the sloped edge such that a distance L3 between the corner and the sloped edge, as measured along an imaginary line that intersects the sloped edge at a right angle, is less than L1, and L2 is greater than L1; (C) orienting the regulator module such that the sloped edge of the window panel is substantially vertical whereby the window panel presents a horizontal dimension of L3; (D) moving the oriented regulator module until the window panel passes between the first and second edges of the inner panel and into a first space defined between the inner panel and the outer panel; (E) rotating the regulator module within the space so that the maximum width L2 is horizontally oriented; and (F) fixing the inner frame to the inner panel.

Additional objects and advantages of the present invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiments of the invention, and together with the general description given above and the detailed description of the preferred embodiments given below, serve to explain the principles of the invention.

DETAILED DESCRIPTION OF THE PREFERRED EMBODIMENTS

Figure 1:
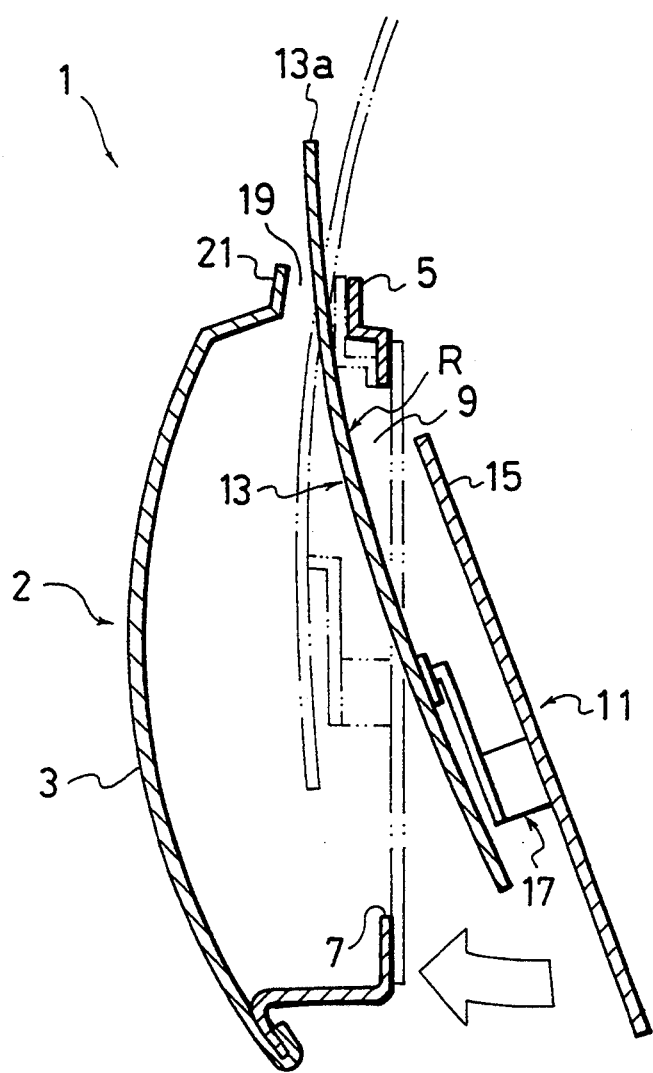
FIG. 1 is a cross-sectional view of a conventional door structure.
Figure 2:
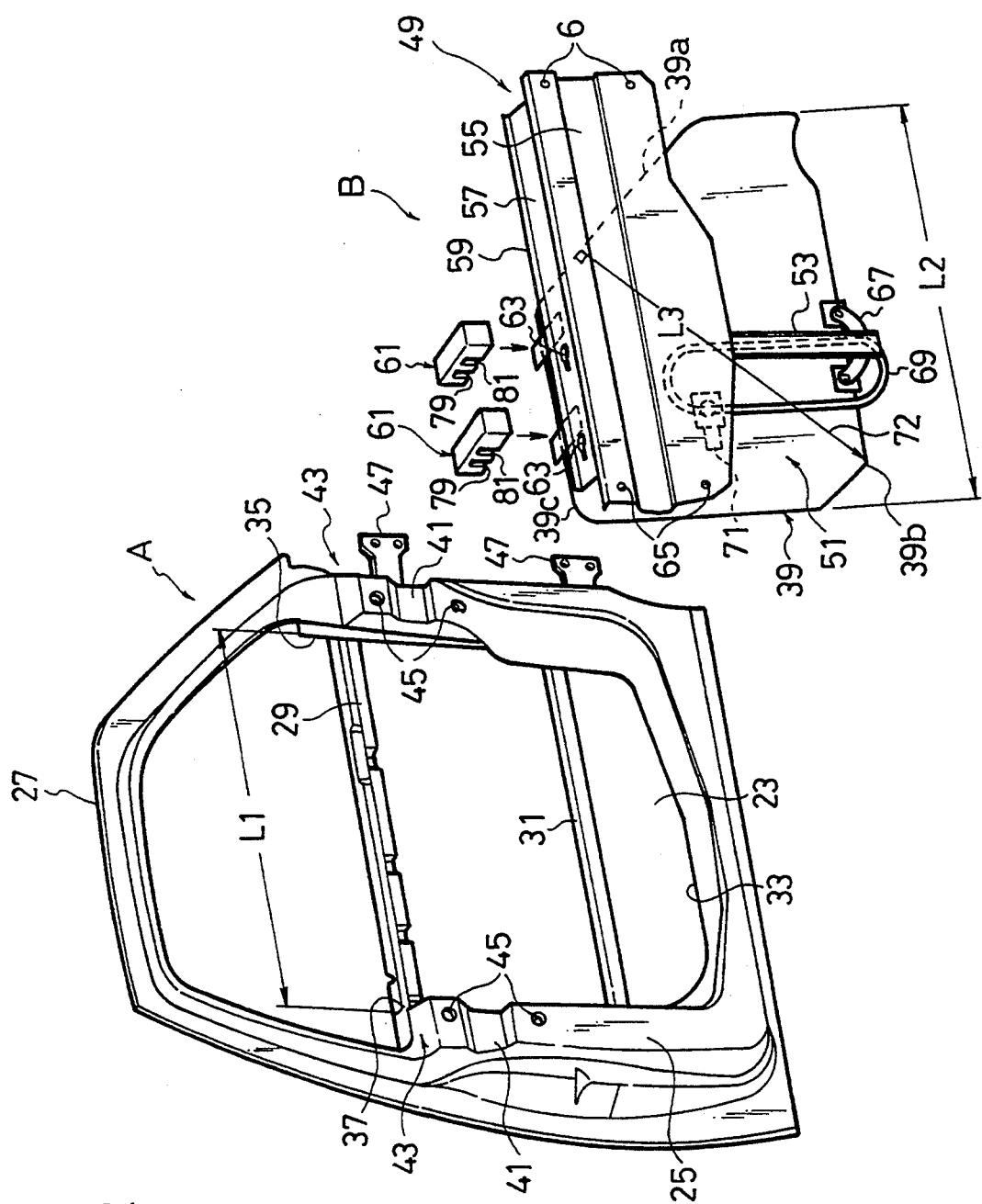
FIG. 2 is an exploded view of an outer module and a regulator module prior to assembly, according to a first embodiment of the present invention.
Figure 3:
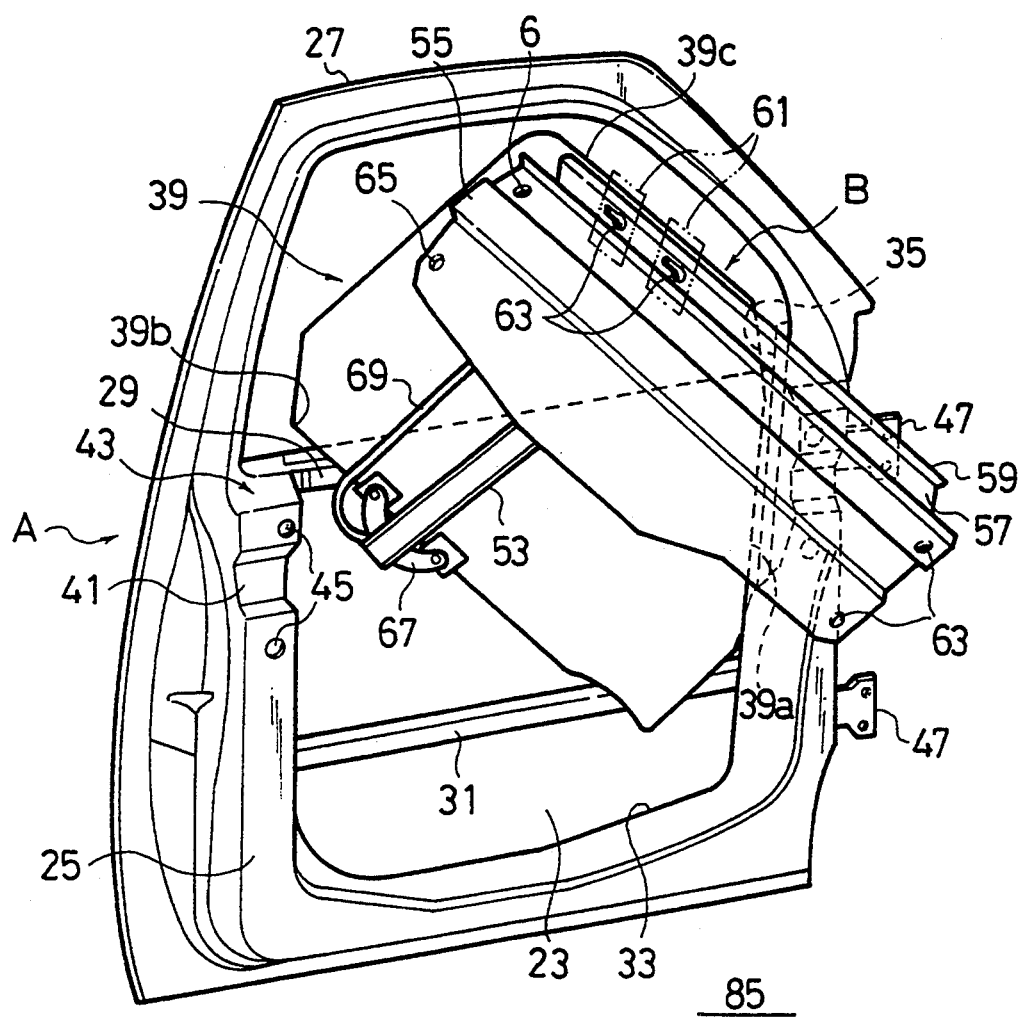
FIG. 3 shows a rotated position of the regulator module allowing it to be inserted into the opening of inner panel.
Figure 4:
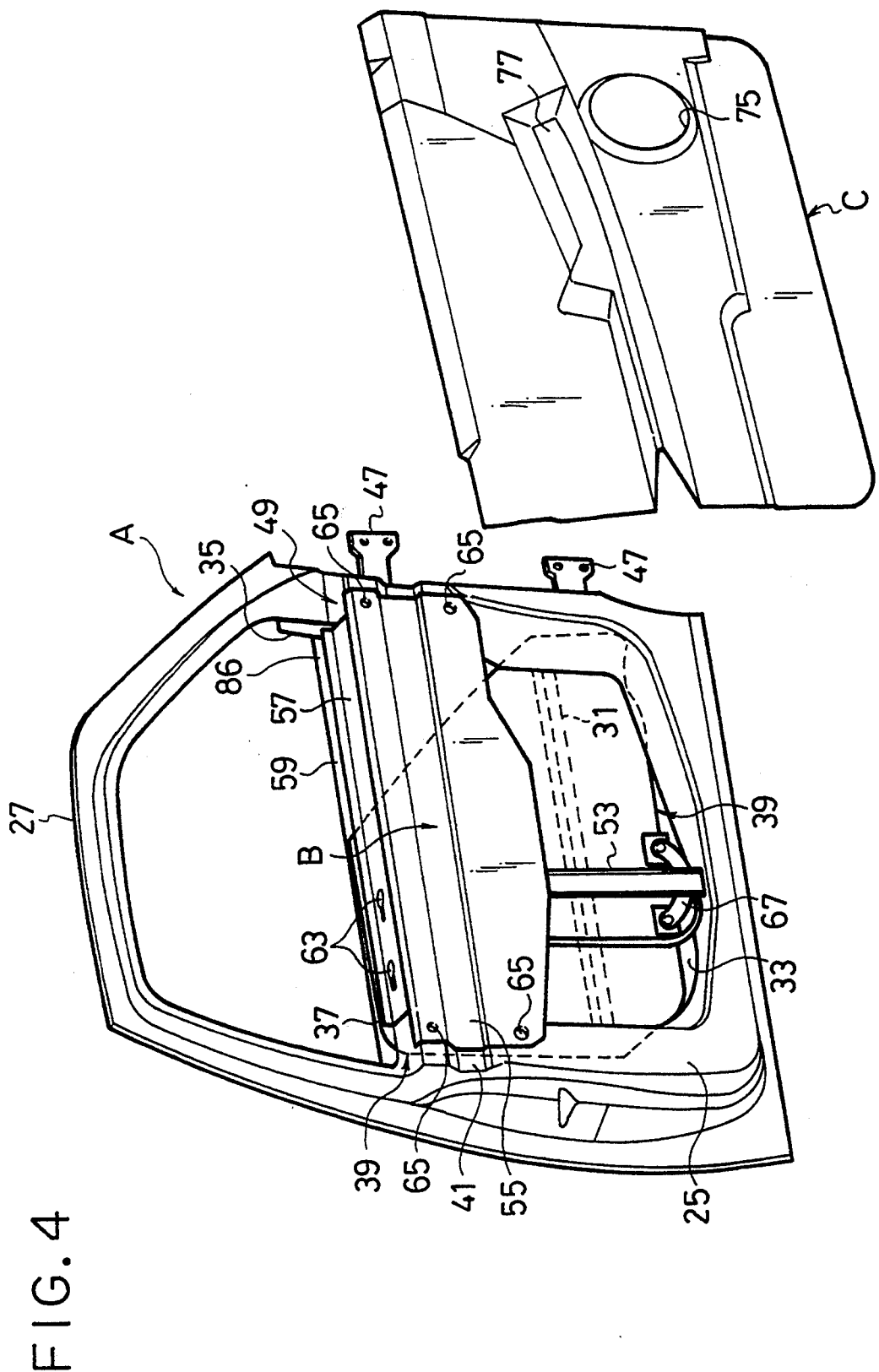
FIG. 4 shows the outer module and regulator module connected to each other with the inner module separated therefrom.

FIGS. 2-6 show a vehicle door according to a first embodiment of the present invention. The door includes an outer module A, a regulator module B and an inner module C (as shown in FIG. 4).

The outer module A includes an outer panel 23, an inner panel 25, and a sash 27. A guard member 29 is attached to an upper edge of the outer panel 23. A reinforcement structure 31 is provided on the interior side of the outer panel 23 to provide rigidity thereto. The inner panel 25 has a large opening 33 which is cut out from an upper portion of the inner panel 25. The inner panel 25, is U-shaped, and has first and second edges 35 and 37 which define the large opening 33 therebetween. The large opening 33 extends vertically within the inner panel 25. Length L1 between the first edge 35 and the second edge 37 is shorter than length L2 of a door window panel 39. A U-shaped portion 41 is provided on a waist portion 43 of inner panel 25 in order to increase the rigidity of the inner panel 25. Bolt holes 45, 45 are formed at the waist portion 43. Welded nuts (not shown) are provided on an outside of the bolt holes 45. The inner panel 25 is provided with upper and lower hinges 47, 47 at the front side thereof relative to the front of the vehicle.

The regulator module B includes an inner frame 49, a regulator 51, a support plate (board) 53, and the door window panel 39. The inner frame 49 has a U-shaped portion 55 extending horizontally there across. The U-shaped portion 55 corresponds to the U-shaped portion 41 of the inner panel 25 and fits therein upon assembly in order to increase the rigidity of the regulator module B. The inner frame 49 has a flat horizontal portion 57 at a top side thereof, which extends horizontally toward the outer module A. The flat horizontal portion 57 has a length in its longitudinal direction which corresponds to the length L1 of the large opening 33 defined between the first and second edges 35, 37. A flange 59 is contiguous with an inside edge of the horizontal portion 57 at a top side thereof, and extends upward therefrom at a right angle. A pair of box-shaped holders 61, 61 are mounted on the inner frame 49 via respective keyhole shaped holes 63, 63 formed in the flat horizontal surface 57. Additionally, holes 65, 65 are formed at opposite ends of the inner frame 49.

The regulator 51 is provided on the outside of the inner frame 49 and includes a bracket 67 which is vertically moveable along a rail (not shown) provided on the outside of the support plate (board) 53, a wire or cable 69 which is connected to the bracket 67, and an actuator 71 (such as a manual handle mechanism or a motor of a power window) for actuating movement of the cable 69. The bottom of the door window panel 39 is fixed to the bracket 67 such that the door window panel 39 is located outside of the regulator 51. The cable 69 transmits motion from the actuator 71 to the bracket 67, and therefore, the actuator 71 causes the bracket 67 to move up and down together with the window panel 39 relative to inner frame 49. The length L2 of the door window panel 39 is longer than the length L1 between the first edge 35 and the second edge 37, as mentioned above. However, length L3 as measured along a line extending at a right angle from a sloped edge 39a of window panel 39 to a corner 39b of window panel 39, is shorter than the length L1.

The inner module C, as shown in FIG. 4, is located at the innermost side of the door 73. A cut-out 75 for a speaker, and an arm rest portion 77 are provided on the inner module C.

Figure 5:
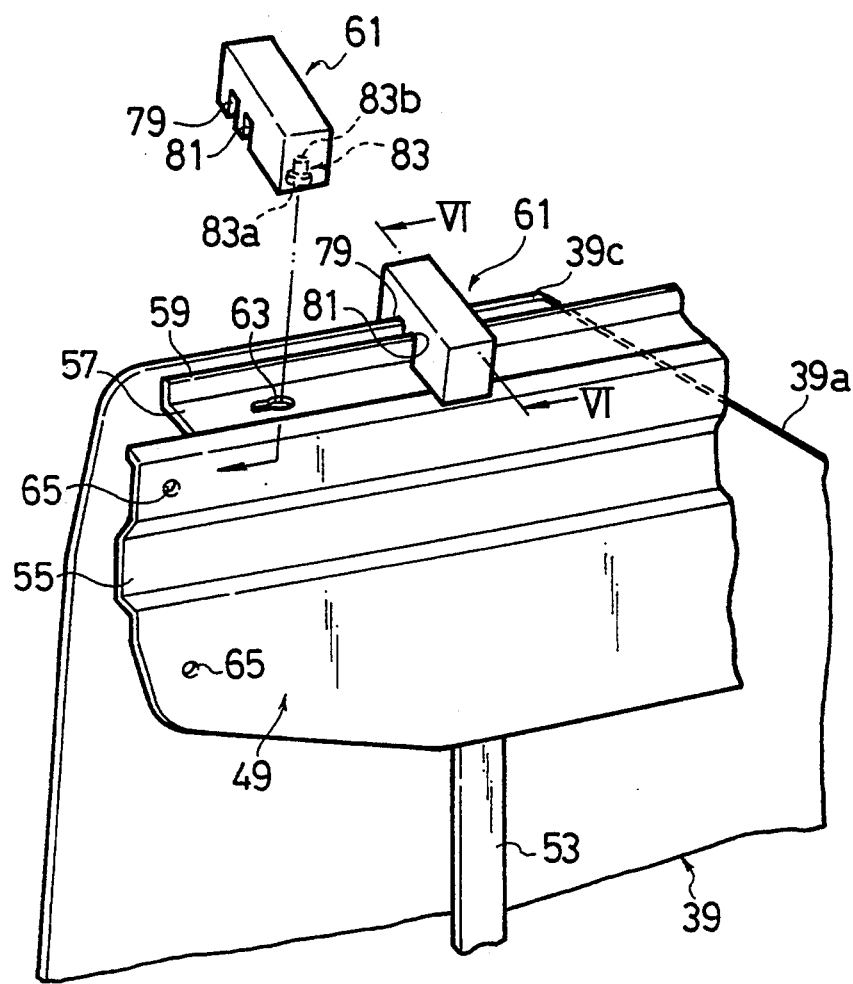
FIG. 5 is a perspective view of an upper portion of the regulator module.

The door is assembled in the following manner. First, an upper portion 39c of the door window panel 39 is positioned alongside the flange 59 of the inner frame 49. The upper portion 39c of the door window panel 39 is then fixed to the flange 59 by the holders 61, as shown in FIG. 5. That is, slots 79, 81 on the bottom side of each of the holders 61 respectively receive the upper portion 39c of the door window panel 39 and the flange 59. A projection 83 extending from the bottom side of each of the holders 61 has a head portion 83a which extends from a neck portion 83b thereof. The holders 61 are mounted on the horizontal flat portion 57 of the inner frame 49 by lowering the holders 61 until the upper portion 39c of the window panel 39 and the flange 59 are respectively inserted into the slots 71, 81, while the head and neck portions 83a, 83b of the holders 61 pass through a respective keyhole 63. The holders 61 are fixed in position to the inner frame 49 by sliding the holders 61 horizontally so that the neck portion 83b of projection 83 is disposed in a narrow portion of the keyhole 63. Due to mounting of the holders 61, as discussed above, the upper portion 39c of the door window panel 39 is precisely positioned relative to the inner frame 49, as shown in FIG. 6.

Figure 6:
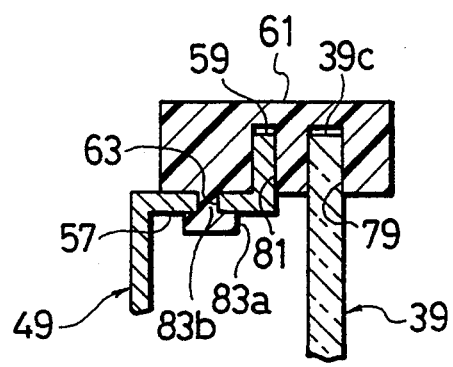
FIG. 6 is a sectional view taken along a line VI—VI of FIG. 5.

When the door window panel 39 is held in place relative to the inner frame 49 by the holders 61 as shown in FIG. 6, the regulator module B is rotated until the sloped edge 39a of the door window panel 39 is substantially perpendicular (vertical) relative the ground surface 85, as shown in FIG. 3. Therefore the horizontal width (L3) of door window panel 39, as positioned in FIG. 3, is shorter than the length L1 between the first and second edges 35, 37 because the length L3 is shorter than the length L1. It is thus possible for the door window panel 39 and the regulator 51 to be positioned into the space between the sash 27, the inner panel 25 and the outer panel 23.

After the door window panel 39 and the regulator 51 are positioned to the outside of the inner panel 25, the regulator module B is rotated in a reverse direction until the regulator module B is oriented as shown in FIG. 4. At this point, the door window panel 39 and the regulator 51 are positioned in a space defined between the outer panel 23 and the inner panel 25. The holes 65 of the inner frame 49 are positioned to coincide with the bolt holes 45 of the waist portion 43 so that the regulator module B can be fixed to the outer module A by bolts (not shown) passing through each of the holes 45, 65 and engaging in the welded nuts (not shown) attached at the outside of holes 45. When the regulator module B is fixed in place, a window opening 86 through which the door window panel 39 passes during raising and lowering of the window panel 39, is defined between the inside upper end of the outer panel 23 and the flange 59 of the inner frame 49.

After fixing the regulator module B to the outer panel 23, the holders 61 are removed and then the inner module C is fixed to the inside of the inner panel 25 and the inside of the inner frame 49 by the use of conventional clips (not shown).

Figure 7:
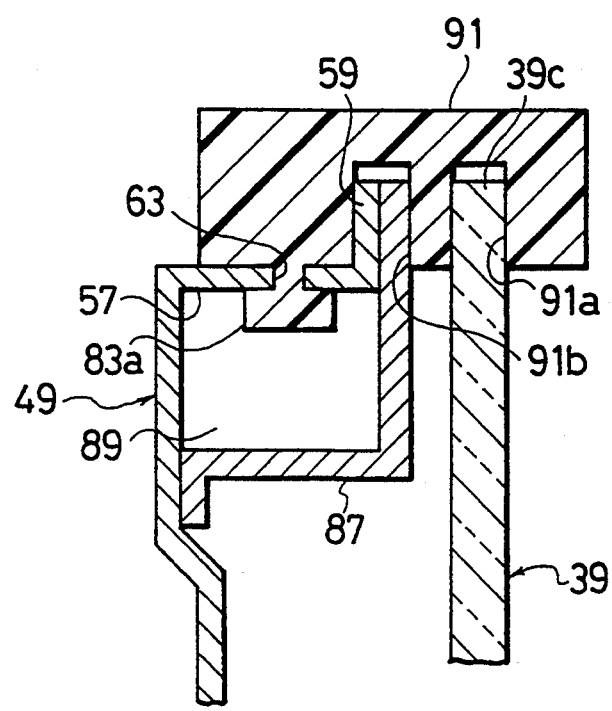
FIG. 7 is a sectional view of a second embodiment of the regulator module as viewed along a line similar to line VI—VI of FIG. 5.

FIG. 7 shows a vehicle door according to a second embodiment of the present invention having a different regulator module. A Z-shaped reinforcing plate 87 is joined to the flange 59 of the inner frame 49 such that a substantially box shaped opening 89 extends along the longitudinal length of the inner frame 49 at an upper portion thereof. A holder 91 has two slots 91a, 91b therein. The flange 59 and an upper end of the reinforcing plate 87 are inserted in the slot 91b and the upper portion 39c of the door window panel 39 is inserted in the slot 91a. The Z-shaped reinforcing plate 87 provides for increased rigidity of the regulator module B.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A door structure for a vehicle comprising:
   an outer module including an inner panel and an outer panel connected to said inner panel, said inner panel having an opening defining in part by first and second edges having a distance L1 therebetween; and
   a regulator module including an inner frame which is fixed to said inner panel, a regulator fixed to said inner frame, and a window panel connected to said regulator and being movable by said regulator between first and second positions, wherein said window panel has a maximum width L2, an edge sloped relative to a horizontal plane and a corner opposite from said sloped edge such that a distance L3 between said corner and said sloped edge, as measured along an imaginary line intersecting said sloped edge at a right angle, is less than L1, and L2 is greater than L1.

2. A door structure for a vehicle as recited in claim 1, wherein said inner frame includes a U-shaped portion said inner panel has a pair of U-shaped mounting surfaces each being proximate to a respective one of said first and second edges, and said U-shaped portion of said inner frame is mounted to each of said U-shaped mounting surfaces.

3. A door structure for a vehicle as recited in claim 2, wherein said window panel is positioned in a space defined between said first and second edges, said inner frame and said outer panel.

4. A door structure for a vehicle as recited in claim 3, wherein said regulator includes a cable, a bracket fixedly connected to said window panel and to said cable, and an actuator for moving said cable thereby causing a corresponding movement of said window panel between said first and second positions.

5. A process for assembling a door structure of a vehicle comprising of the steps of:
   (A) providing an outer module including an inner panel and an outer panel connected to the inner panel, the inner panel having an opening defined in part by first and second edges having a distance L1 therebetween;
   (B) providing a regulator module including an inner frame which is fixed to said inner panel, a regulator fixed to the inner frame, and a window panel connected to the regulator and being movable by the regulator between first and second positions, wherein the window panel has a maximum width L2, an edge sloped relative to a horizontal plane and a corner opposite to the sloped edge such that a distance L3 between the corner and the sloped edge, as measured along an imaginary line intersecting the sloped edge at a right angle, is less than L1, and L2 is greater than L1;
   (C) orienting the regulator module such that the sloped edge of the window panel is substantially vertical whereby the window panel presents a horizontal dimension of L3;
   (D) moving the oriented regulator module until the window panel passes between the first and second edges of the inner panel and into a space defined between the inner panel and the outer panel;
   (E) rotating the regulator module within the space so that the maximum width L2 is horizontally oriented;
   (F) fixing the inner frame to the inner panel.

6. A process as recited in claim 5, further comprising the steps of placing a holder on the window panel and the inner frame, thereby connecting the inner frame to the window panel; and after step (F) removing the holder.

* * * * *